US012540830B2

(12) United States Patent
Malka et al.

(10) Patent No.: US 12,540,830 B2
(45) Date of Patent: Feb. 3, 2026

(54) DIGITAL REMOTE MAPPING OF SUBSURFACE UTILITY INFRASTRUCTURE

(71) Applicant: 4M Analytics Ltd, Tel-Aviv (IL)

(72) Inventors: Itzik Malka, Tel Aviv (IL); Yoav Cohen, Hogla (IL); Nir Cohen, Kochav Yair (IL); Dror Steinmetz, Tel-Aviv (IL); Ayal Green, Ramat-Gan (IL); Harel Dan, Kfar Ruppin (IL); Ophir Wainer, Quebec (CA)

(73) Assignee: 4M ANALYTICS LTD, Tel-Aviv (IL)

( * ) Notice: Subject to any disclaimer, the term of this patent is extended or adjusted under 35 U.S.C. 154(b) by 256 days.

(21) Appl. No.: 18/150,592

(22) Filed: Jan. 5, 2023

(65) Prior Publication Data

US 2023/0221137 A1 Jul. 13, 2023

Related U.S. Application Data

(63) Continuation-in-part of application No. PCT/IL2021/050839, filed on Jul. 8, 2021.

(30) Foreign Application Priority Data

Jul. 9, 2020 (IL) .......................................... 275945
Jan. 7, 2022 (EP) ..................................... 22150534

(51) Int. Cl.
*G01C 21/00* (2006.01)
*G06V 20/10* (2022.01)

(52) U.S. Cl.
CPC ..... *G01C 21/3826* (2020.08); *G01C 21/3822* (2020.08); *G06V 20/182* (2022.01); *G06V 20/194* (2022.01)

(58) Field of Classification Search
CPC ............ G01C 21/3826; G01C 21/3822; G06V 20/194; G06V 20/182
See application file for complete search history.

(56) References Cited

U.S. PATENT DOCUMENTS 9,014,415 B2 * 4/2015 Chen .................... G06T 7/0002
382/100
10,095,995 B2 10/2018 Green et al.
(Continued)

FOREIGN PATENT DOCUMENTS

CN 108764205 A 11/2018
EP 3 748 583 A1 9/2020

OTHER PUBLICATIONS

Bilal, et al., Inferring the most probably maps of underground utilities using Bayesian mapping model, Journal of Applied Geophysics, 150:52-66 (2018).
(Continued)

*Primary Examiner* — Luke Huynh
(74) *Attorney, Agent, or Firm* — FisherBroyles, LLP; Roger L. Browdy; Ronni S. Jillions

(57) ABSTRACT

There is provided a digital map product comprising data informative of a location of a zone in a surface area including a subsurface utility infrastructure (SUI), the digital map product being derivative of a method comprising: receiving a digital image of the surface area; identifying a plurality of surface features; for each of the plurality of surface features: calculating an indication of utility location (IUL) from the respective surface feature and location, wherein the IUL is one of: a location of a point of the SUI, a location of a zone of the SUI, a location of a zone from which the SUI is absent, thereby giving rise of a plurality of IULs; and defining a location of a zone including the SUI in accordance with, at least, the plurality of IULs wherein at least one surface feature of the plurality of surface features is a public works surface marking.

17 Claims, 10 Drawing Sheets

(56) References Cited

U.S. PATENT DOCUMENTS

2013/0269593 A1* 10/2013 Upchurch, II ........... H02G 9/02
                                                                                        29/527.2
2019/0235492 A1    8/2019  Kueny et al.
2020/0097618 A1    3/2020  Agouridis
2023/0029746 A1*  2/2023  Raufi ....................... G01V 3/12

OTHER PUBLICATIONS

Tanoli, et al., Damage Prevention for underground utilities using machine guidance, Automation in Construction, 107:1-15 (2019).
Chahinian Nanee et al: "Automatic mapping of urban wastewater networks based on manhole cover locations", Computers, Environment Ano Urban Systems, vol. 78, Aug. 10, 2019 (Aug. 10, 2019), XP085815655.

* cited by examiner

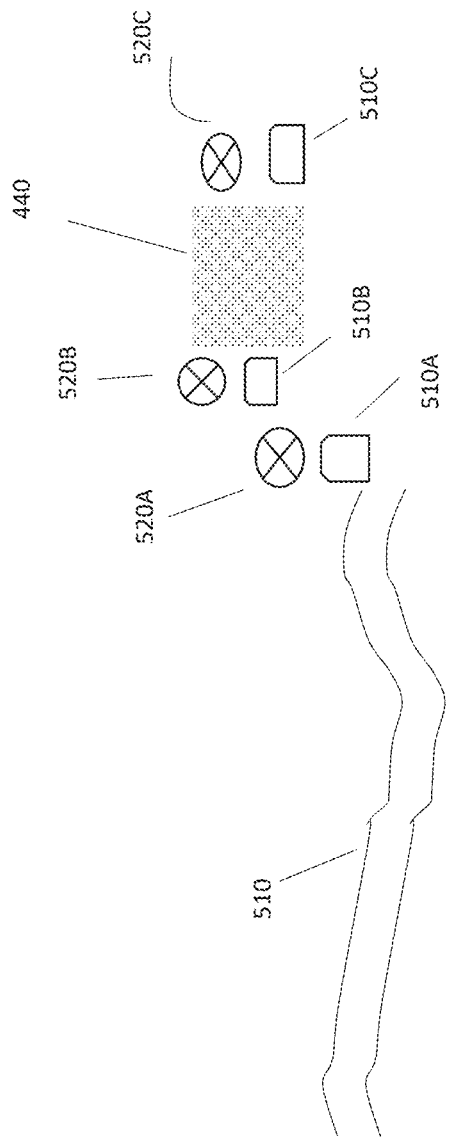

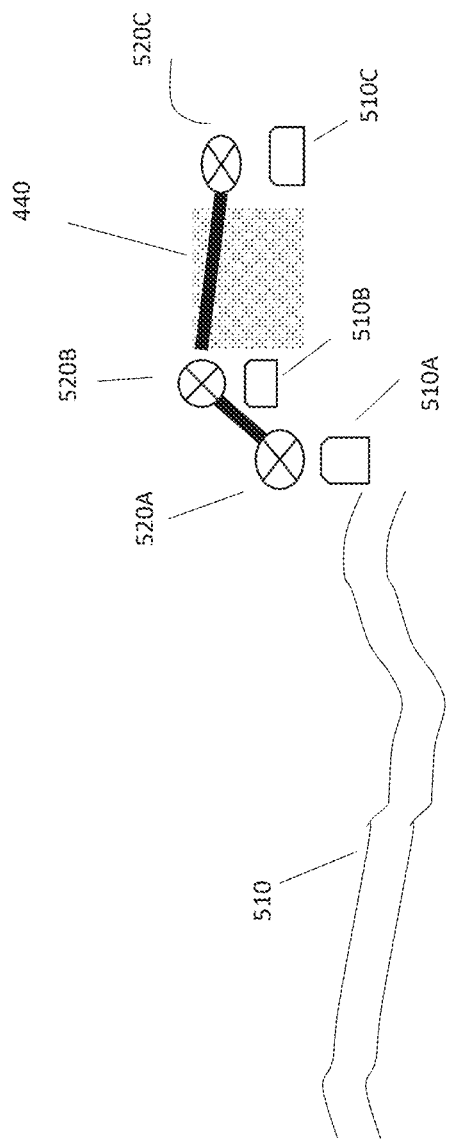

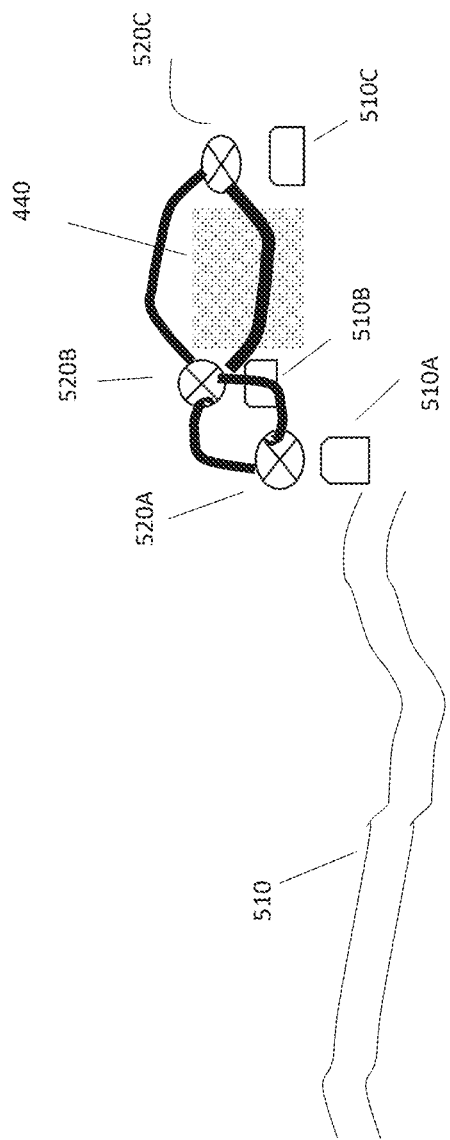

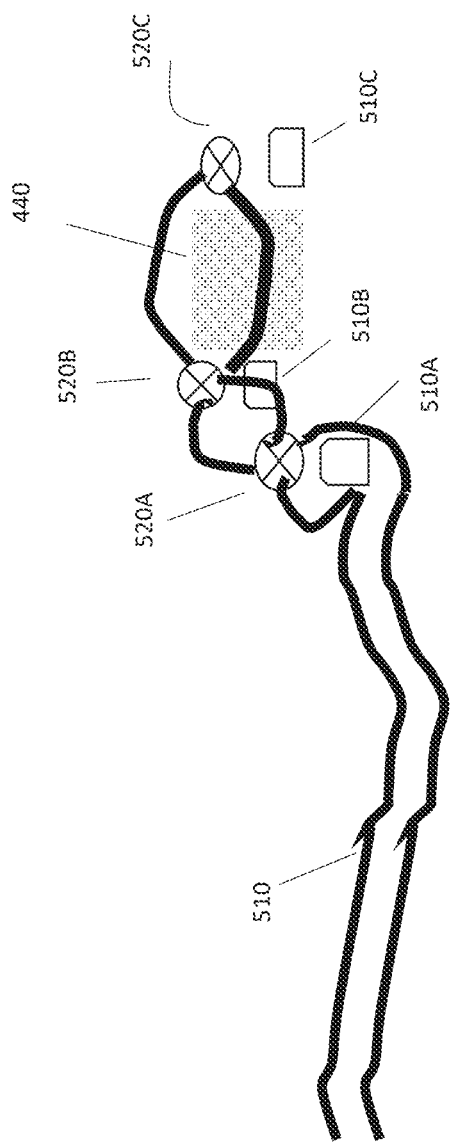

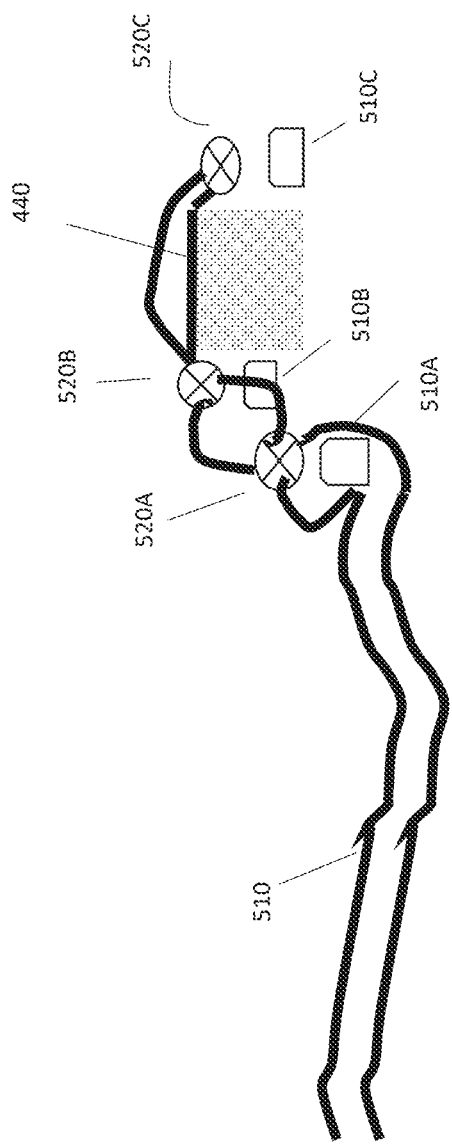

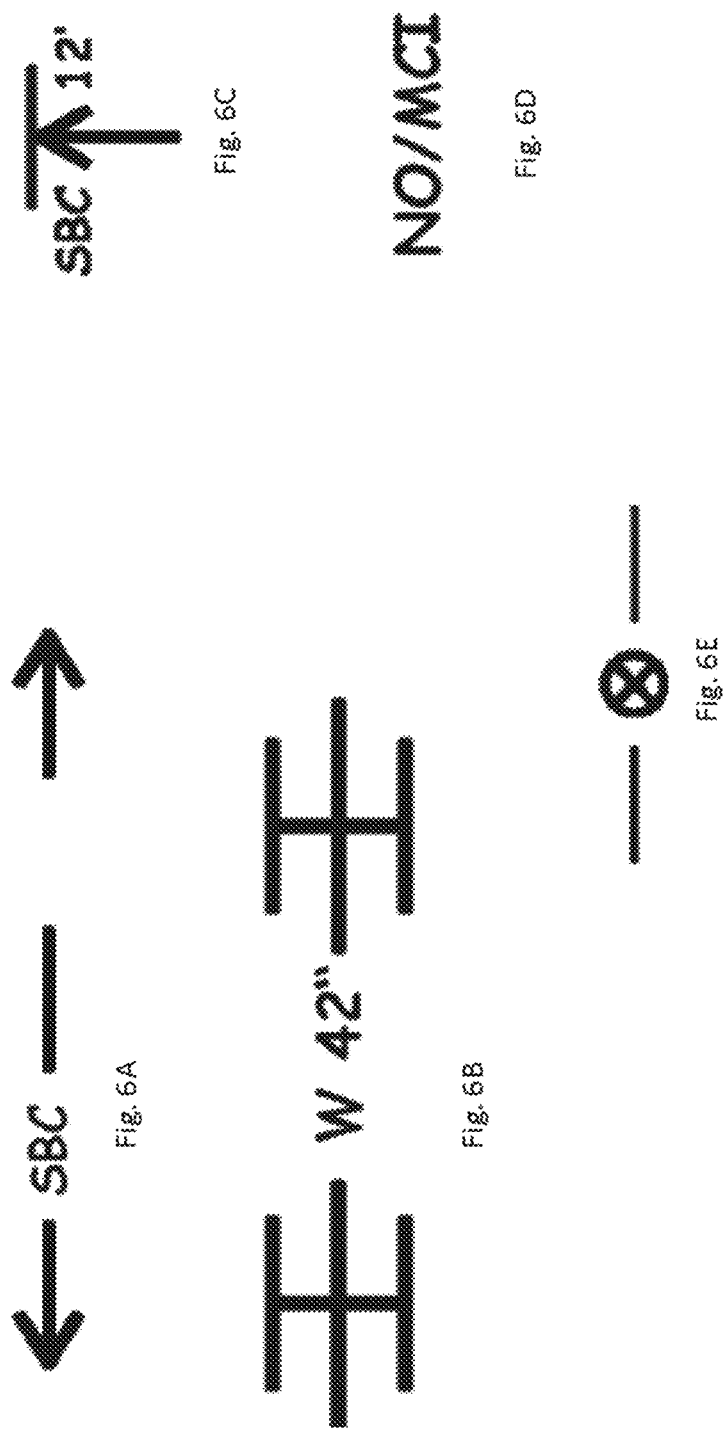

DIGITAL REMOTE MAPPING OF SUBSURFACE UTILITY INFRASTRUCTURE

TECHNICAL FIELD

The presently disclosed subject matter relates to mapping, and in particular to methods of remotely creating digital maps of subsurface utility infrastructure.

BACKGROUND

Problems of mapping of subsurface utility infrastructure have been recognized in the conventional art and various techniques have been developed to provide solutions.

GENERAL DESCRIPTION

According to one aspect of the presently disclosed subject matter there is provided a digital map product comprising data informative of a location of a zone in a surface area including a subsurface utility infrastructure (SUI), the digital map product being derivative of a method comprising:
  a) receiving, by a processing circuitry, a digital image of the surface area;
  b) identifying, by the processing circuitry, in the digital image, a plurality of surface features, each surface feature being associated with a respective surface feature location;
  c) for each of the plurality of surface features:
    calculating, by the processing circuitry, an indication of utility location (IUL) from the respective surface feature and respective surface feature location, wherein the IUL is one of a group consisting of:
      i) data indicative of a location of a point of the SUI,
      ii) data indicative of a location of a zone of the SUI, and
      iii) data indicative of a location of a zone from which the SUI is absent,
    thereby giving rise of a plurality of IULs;
  d) defining, by the processing circuitry, a location of a zone including the SUI in accordance with, at least, the plurality of IULs.

In addition to the above features, the system according to this aspect of the presently disclosed subject matter can comprise one or more of features (i) to (xii) listed below, in any desired combination or permutation which is technically possible:
  (i) the defining the location of the zone is in further accordance with initial utility map data
  (ii) for at least one of the surface features, the calculating an IUL from the respective surface feature comprises:
    determining the IUL in accordance with, at least, the respective surface feature location and a surface feature type of the surface feature
  (iii) the calculating the IUL from the surface feature further comprises:
    determining an IUL location tolerance in accordance with, at least, the surface feature type.
  (iv) the determining an IUL comprises:
    responsive to the surface feature type being an infrastructure connecting point:
      calculating a location of a point of the SUI in accordance with a utility distance range associated with an infrastructure connecting point type.
  (v) further comprising:
    calculating an IUL location tolerance in accordance with the utility distance range associated with an infrastructure connecting point type.
  (vi) the calculating the location of the point of the SUI is in further accordance with:
    a) an orientation of the surface feature; and
    b) an infrastructure direction associated with the infrastructure connecting point type.
  (vii) the determining an IUL comprises:
    responsive to the surface feature type being an excavation footprint, calculating a location of a zone of the SUI in accordance with the surface feature location.
  (viii) the determining an IUL comprises:
    responsive to the surface feature type being an unexcavated terrain area, calculating a location of a zone from which the SUI is absent, in accordance with the surface feature location.
  (ix) the subsurface utility infrastructure comprises electric power transmission, and the infrastructure connecting point type is selected from a list consisting of:
    an electrical transformer;
    an electrical transmission pole; and
    an electrical access hole.
  (x) the subsurface utility infrastructure comprises water transport, and the infrastructure connecting point type is selected from a list consisting of:
    a water valve;
    a drain; and
    a pumping station.
  (xi) the image is of a type selected from a list consisting of:
    camera; infrared; hyperspectral; multispectral; electro-optic imaging;
    synthetic aperture radar imaging; magnetic sensing; remote geophysical sensing; and lidar.
  (xii) the image is of a vantage point selected from a list consisting of:
    overhead; horizontal, space; aerial; ground; and façade.

According to another aspect of the presently disclosed subject matter there is provided a method of determining digital map product comprising data informative of a location of a zone in a surface area including a subsurface utility infrastructure (SUI), the method comprising:
  a) receiving, by a processing circuitry, a digital image of the surface area;
  b) identifying, by the processing circuitry, in the digital image, a plurality of surface features, each surface feature being associated with a respective surface feature location;
  c) for each of the plurality of surface features:
    calculating, by the processing circuitry, an indication of utility location (IUL) from the respective surface feature and respective surface feature location, wherein the IUL is one of a group consisting of:
      i) data indicative of a location of a point of the SUI,
      ii) data indicative of a location of a zone of the SU, and
      iii) data indicative of a location of a zone from which the SUI is absent,
    thereby giving rise of a plurality of IULs;
  d) defining, by the processing circuitry, a location of a zone including the SUI in accordance with, at least, the plurality of IULs.

This aspect of the disclosed subject matter can further optionally comprise one or more of features (i) to (xii) listed above with respect to the digital map product, mutatis mutandis, in any desired combination or permutation which is technically possible.

According to another aspect of the presently disclosed subject matter there is provided a system of determining data informative of a location of a zone in a surface area including a subsurface utility infrastructure (SUI), the system comprising a processing circuitry configured to perform:
a) receiving a digital image of the surface area;
b) identifying in the digital image, a plurality of surface features, each surface feature being associated with a respective surface feature location;
c) for each of the plurality of surface features:
calculating an indication of utility location (IUL) from the respective surface feature and respective surface feature location, wherein the IUL is one of a group consisting of:
 i) data indicative of a location of a point of the SUI,
 ii) data indicative of a location of a zone of the SUI, and
 iii) data indicative of a location of a zone from which the SUI is absent,
thereby giving rise of a plurality of IULs;
d) defining a location of a zone including the SUI in accordance with, at least, the plurality of IULs.

This aspect of the disclosed subject matter can further optionally comprise one or more of features (i) to (xii) listed above with respect to the digital map product, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of determining data informative of a location of a zone in a surface area including a subsurface utility infrastructure (SUI), the method comprising.
a) receiving a digital image of the surface area;
b) identifying in the digital image, a plurality of surface features, each surface feature being associated with a respective surface feature location;
c) for each of the plurality of surface features:
calculating an indication of utility location (IUL) from the respective surface feature and respective surface feature location, wherein the IUL is one of a group consisting of:
 i) data indicative of a location of a point of the SUI,
 ii) data indicative of a location of a zone of the SUI, and
 iii) data indicative of a location of a zone from which the SUI is absent,
thereby giving rise of a plurality of IULs;
d) defining a location of a zone including the SUI in accordance with, at least, the plurality of IULs.

This aspect of the disclosed subject matter can further optionally comprise one or more of features (i) to (xii) listed above with respect to the digital map product, mutatis mutandis, in any desired combination or permutation which is technically possible.

According to one aspect of the presently disclosed subject matter there is provided a digital map product comprising data informative of a location of a zone in a surface area including a subsurface utility infrastructure (SUI), the digital map product being derivative of a method comprising:
a) receiving, by a processing circuitry, a digital image of the surface area;
b) identifying, by the processing circuitry, in the digital image, one or more surface features, each surface feature being associated with a respective surface feature location;
c) for one or more of the identified surface features:
calculating, by the processing circuitry, an indication of utility location (IUL) from the respective surface feature and respective surface feature location, wherein the IUL is one of a group consisting of:
 i) data indicative of a location of a point of the SUI,
 ii) data indicative of a location of a zone of the SUI, and
 iii) data indicative of a location of a zone from which the SUI is absent,
thereby giving rise to one or more calculated IULs; and
d) defining, by the processing circuitry, a location of a zone including the SUI in accordance with, at least, one or more of the calculated IULs;
wherein at least one surface feature of the plurality of surface features is a public works surface marking (PWSM).

In addition to the above features, the system according to this aspect of the presently disclosed subject matter can comprise one or more of features (i) to (xii) listed below, in any desired combination or permutation which is technically possible:

(i) the defining the location of the zone is in further accordance with initial utility map data.
(ii) for at least one of the surface features, the calculating an IUL from the respective surface feature comprises:
determining the IUL in accordance with, at least, the respective surface feature location and a surface feature type of the surface feature.
(iii) the calculating the IUL from the surface feature further comprises:
determining an IUL location tolerance in accordance with, at least, the surface feature type.
(iv) the determining an IUL comprises:
responsive to the surface feature type being an infrastructure connecting point:
calculating a location of a point of the SUI in accordance with a utility distance range associated with an infrastructure connecting point type.
(v) further comprising:
calculating an IUL location tolerance in accordance with the utility distance range associated with an infrastructure connecting point type.
(vi) the calculating the location of the point of the SUI is in further accordance with:
a) an orientation of the surface feature; and
b) an infrastructure direction associated with the infrastructure connecting point type.
(vii) the determining an IUL comprises:
responsive to the surface feature type being one of a group consisting of:
a) a utility point road marking, and
b) a utility point marking flag,
calculating a location of a point of the SUI in accordance with a utility distance range associated with, at least, the surface feature location.
(viii) the determining an IUL comprises:
responsive to the surface feature type being one of a group consisting of:
a) an excavation footprint, and
b) a utility location linear road marking, calculating a location of a zone of the SUI in accordance with, at least, the surface feature location.
(ix) the determining an IUL comprises:
responsive to the surface feature type being one of a group consisting of:
a) an unexcavated terrain area, and
b) a utility absence zone road marking,
calculating a location of a zone from which the SUI is absent, in accordance with, at least, the surface feature location.
(x) the determining an IUL comprises:
responsive to the surface feature type being a displaced utility point indicator road marking, calculating a location of a point from of the SUI, in accordance with, at least:
the surface feature location;
a displacement direction associated with the displaced utility point indicator; and
a displacement distance associated with the displaced utility point indicator.
(xi) each of the one or more calculated IULs in accordance with which the zone is defined is derivative of a PWSM surface feature that is associated with at least one of a group consisting of:
a. a first utility type; and
b. a first utility operator;
(xii) the image is of a type selected from a list consisting of:
camera; infrared; hyperspectral; multispectral; electro-optic imaging;
synthetic aperture radar imaging; magnetic sensing; remote geophysical sensing; ground penetrating radar; and lidar; and
wherein the image is of a vantage point selected from a list consisting of:
overhead; space; aerial; ground; façade; and horizontal view.

According to another aspect of the presently disclosed subject matter there is provided a method of determining digital map product comprising data informative of a location of a zone in a surface area including a subsurface utility infrastructure (SUI), the method comprising:
a) receiving, by a processing circuitry, a digital image of the surface area;
b) identifying, by the processing circuitry, in the digital image, one or more PWSM surface features, each surface feature being associated with a respective surface feature location;
c) for one or more of the PWSM surface features:
calculating, by the processing circuitry, an indication of utility location (IUL) from the respective surface feature and respective surface feature location, wherein the IUL is one of a group consisting of:
i) data indicative of a location of a point of the SUI,
ii) data indicative of a location of a zone of the SUI, and
iii) data indicative of a location of a zone from which the SUI is absent,
thereby giving rise to one or more calculated IULs; and
d) defining, by the processing circuitry, a location of a zone including the SUI in accordance with, at least, one or more of the calculated IULs.

This aspect of the disclosed subject matter can further optionally comprise one or more of features (i) to (xii) listed above with respect to the digital map product, mutatis mutandis, in any desired combination or permutation which is technically possible.

According to another aspect of the presently disclosed subject matter there is provided a system of determining data informative of a location of a zone in a surface area including a subsurface utility infrastructure (SUI), the system comprising a processing circuitry configured to perform:
a) receiving, by a processing circuitry, a digital image of the surface area;
b) identifying, by the processing circuitry, in the digital image, one or more PWSM surface features, each surface feature being associated with a respective surface feature location;
c) for one or more of the PWSM surface features:
calculating, by the processing circuitry, an indication of utility location (IUL) from the respective surface feature and respective surface feature location, wherein the IUL is one of a group consisting of:
i) data indicative of a location of a point of the SUI,
ii) data indicative of a location of a zone of the SUI, and
iii) data indicative of a location of a zone from which the SUI is absent,
thereby giving rise to one or more calculated IULs; and
d) defining, by the processing circuitry, a location of a zone including the SUI in accordance with, at least, one or more of the calculated IULs.

This aspect of the disclosed subject matter can further optionally comprise one or more of features (i) to (xii) listed above with respect to the digital map product, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of determining data informative of a location of a zone in a surface area including a subsurface utility infrastructure (SUI), the method comprising:
a) receiving a digital image of the surface area;
b) identifying, in the digital image, one or more PWSM surface features, each PWSM surface feature being associated with a respective surface feature location;
c) for each of the PWSM surface features:
calculating an indication of utility location (IUL) from the respective surface feature and respective surface feature location, wherein the IUL is one of a group consisting of:
i) data indicative of a location of a point of the SUI,
ii) data indicative of a location of a zone of the SUI, and
iii) data indicative of a location of a zone from which the SUI is absent,
thereby giving rise to one or more calculated IULs; and
d) defining a location of a zone including the SUI in accordance with, at least, one or more of the calculated IULs.

This aspect of the disclosed subject matter can further optionally comprise one or more of features (i) to (xii) listed above with respect to the digital map product, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 5A illustrates an example overhead image of a terrain area, together with example surface features, in accordance with some embodiments of the presently disclosed subject matter:

FIG. 5B illustrates an example first step of defining a zone including the subsurface utility infrastructure, in accordance with some embodiments of the presently disclosed subject matter;

FIG. 5C illustrates example tolerance zones resulting from uncertainty of the subsurface path of the electrical supply cable which connects the inferred locations of points of the SUI, in accordance with some embodiments of the presently disclosed subject matter;

FIG. 5D illustrates an example next step of the processing circuitry 210 (e.g. mapping unit 270) extending the defined zone in accordance with the excavation footprint, in accordance with some embodiments of the presently disclosed subject matter;

FIG. 5E illustrates an example additional step of defining the zone of the subsurface utility infrastructure in accordance with the location of the tree area, in accordance with some embodiments of the presently disclosed subject matter;

FIG. 6A illustrates an example public works surface marking, in accordance with some embodiments of the presently disclosed subject matter;

FIG. 6B illustrates an example public works surface marking, in accordance with some embodiments of the presently disclosed subject matter;

FIG. 6C illustrates an example public works surface marking, in accordance with some embodiments of the presently disclosed subject matter;

FIG. 6D illustrates an example public works surface marking, in accordance with some embodiments of the presently disclosed subject matter; and FIG. 6E illustrates an example public works surface marking, in accordance with some embodiments of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "determining", "calculating", "receiving", "providing", "obtaining", "utilizing", "augmenting", "alerting", "defining", "mapping" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
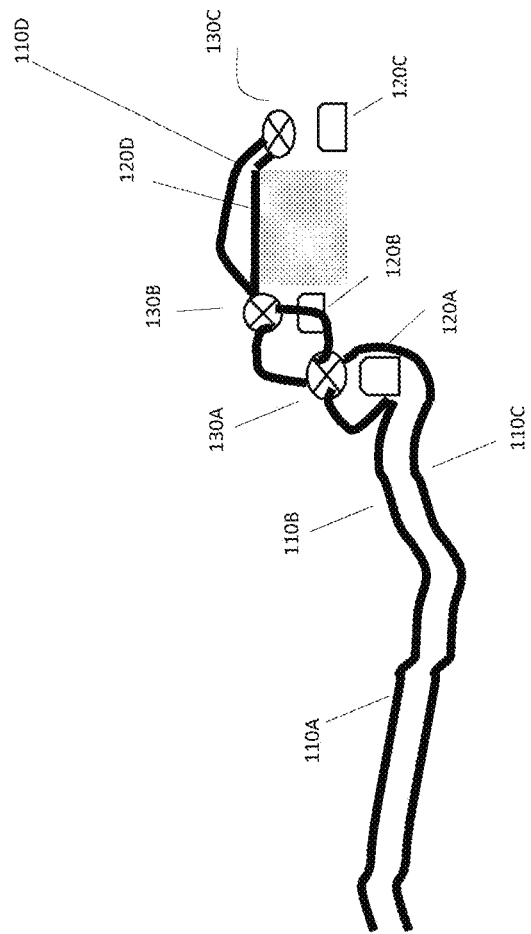
FIG. 1 illustrates an example overhead map of a terrain area, with data informative of one or more locations of zones including subsurface utility infrastructures, in accordance with some embodiments of the presently disclosed subject matter.

Attention is now directed to FIG. 1, which illustrates an example overhead map of a terrain area, with data informative of one or more locations of zones including subsurface utility infrastructures, in accordance with some embodiments of the presently disclosed subject matter.

The map depicts a terrain area that includes various surface features 120A 120B 120C 120D.

The map depicts a zone that includes a subsurface utility infrastructure (for example: a water transport system, electric power transport system etc.). Edges of this zone include the demarcations 110A 110B 110C 110D.

The actual subsurface utility infrastructure (including infrastructure points 130A 130B 130C) can consist of utility lines (e.g. pipes, cables etc) that can be of a certain diameter (e.g. 20 cm). The demarcated zone 110A 110B 110C 110D that includes the utility infrastructure can be wider and/or longer that the actual utility line, and can vary in width (e.g. the zone including the infrastructure can have varying width between 0.5 and 1 meters.

The map can be utilized—for example—in the course of performing excavations in the terrain area so as not to disrupt subsurface utility infrastructures, or to perform upgrades and maintenance on the subsurface utility infrastructures etc.

The map can be a product of a computerized process which identifies surface features in terrain images, calculates indications of utility infrastructure locations from the surface features, and defines zones that include the subsurface utility infrastructures, as will be described hereinbelow.

It is noted that it can be preferable for the defined zones to match the actual locations of subsurface utility infrastructures as closely as is technically possible.

It is noted that the map can be generated and stored in—for example—any digital format. It is further noted that the map can simply contain data informative of the locations of the zones including subsurface utility infrastructures without including any other data. It is further noted that a single digital map can include data pertaining to multiple utility infrastructures in a terrain area.

Figure 2:
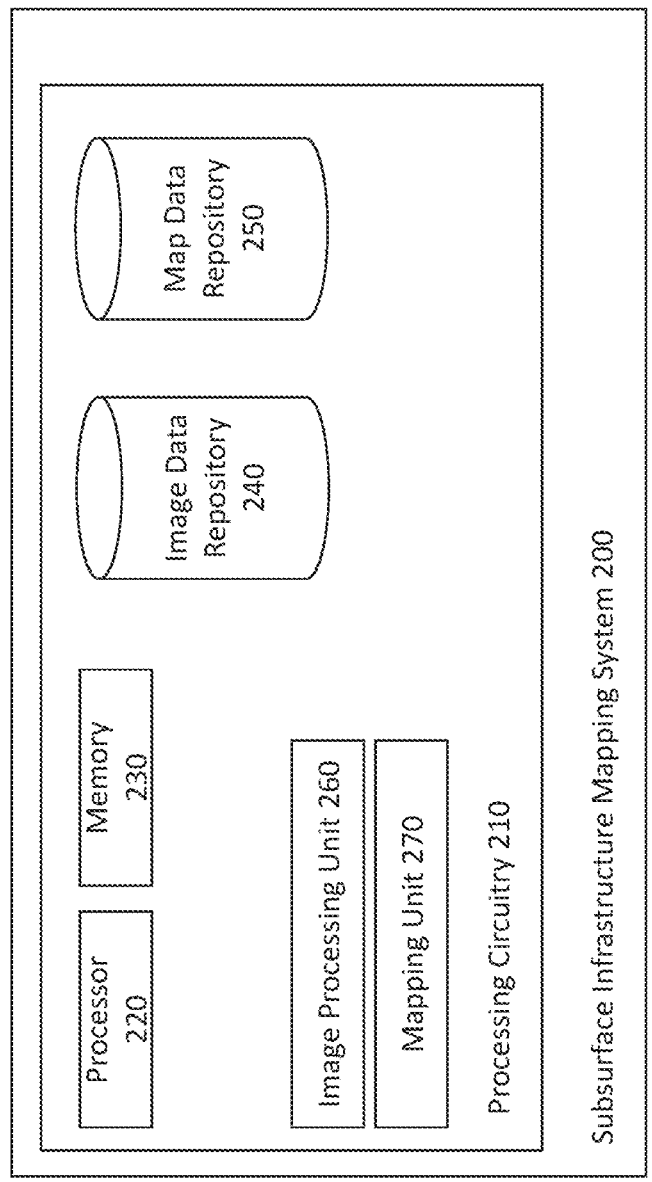
FIG. 2, illustrates an example block diagram of a subsurface infrastructure mapping system, in accordance with some embodiments of the presently disclosed subject matter.

Attention is now directed to FIG. 2, which illustrates an example block diagram of a subsurface infrastructure mapping system, in accordance with some embodiments of the presently disclosed subject matter.

Subsurface infrastructure mapping system 200 can include a processing circuitry 210. Processing circuitry 210 can include a processor 220 and a memory 230.

Processor 220 can be a suitable hardware-based electronic device with data processing capabilities, such as, for example, a general purpose processor, digital signal processor (DSP), a specialized Application Specific Integrated Circuit (ASIC), one or more cores in a multicore processor etc. Processor 220 can also consist, for example, of multiple processors, multiple ASICs, virtual processors, combinations thereof etc.

Memory 230 can be, for example, a suitable kind of volatile and/or non-volatile storage, and can include, for example, a single physical memory component or a plurality of physical memory components. Memory 230 can also include virtual memory. Memory 230 can be configured to, for example, store various data used in computation.

Processing circuitry 210 can be configured to execute several functional modules in accordance with computer-readable instructions implemented on a non-transitory computer-readable storage medium. Such functional modules are referred to hereinafter as comprised in the processing circuitry. These modules can include, for example, image processing unit 260, and mapping unit 270.

Image processing unit 260 can employ—for example—computer vision techniques (e.g. utilizing machine learning methods such as convolutional neural networks or other suitable method) to perform image analysis on terrain images of various types. In this manner, it can extract surface features (and surface feature geographical location information) from an image.

Image processing unit 260 can perform image analysis on—for example—images stored in image data repository 240.

Mapping unit 270 can perform techniques utilizing the extracted surface feature data (e.g. the techniques described hereinbelow with reference to FIGS. 3-5E) to define locations of one or more substructure utility infrastructure (SUI) zones, where each zone contains a particular subsurface utility infrastructure. It is noted that an SUI can be a network of infrastructure components (e.g. pipes, valves, connection points etc.) and that some components can be above-surface while others are subsurface.

Mapping unit 270 can output generated map data to—for example—map data repository 250.

It is noted that the teachings of the presently disclosed subject matter are not bound by the system described with reference to FIG. 2. Equivalent and/or modified functionality can be consolidated or divided in another manner and can be implemented in any appropriate combination of software with firmware and/or hardware and executed on a suitable device. The subsurface infrastructure mapping system 200 can be a standalone entity, or integrated, fully or partly, with other entities.

Figure 3:
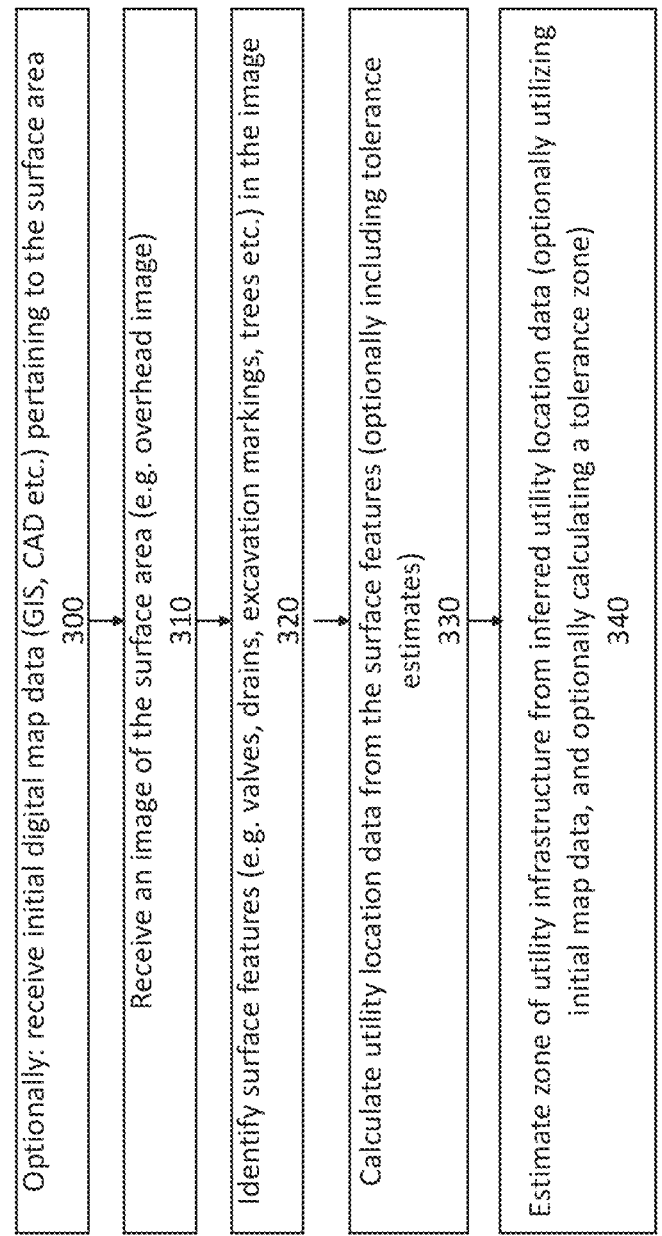
FIG. 3, illustrates a flow diagram of an example process of generating a digital map including data indicative of a location of a zone that includes a subsurface utility infrastructure, in accordance with some embodiments of the presently disclosed subject matter.

Attention is now directed to FIG. 3, which illustrates a flow diagram of an example process of generating a digital map including data indicative of a location of a zone that includes a subsurface utility infrastructure, in accordance with some embodiments of the presently disclosed subject matter.

It is noted that image data repository 240 can be preloaded with one or images of a terrain to be mapped. It is further noted that map data repository 250 can be preloaded with initial map data.

Processing circuitry 210 (for example: image processing unit 260) can optionally receive (300) initial digital map data pertaining to the surface area.

Initial map data can be previously available data describing subsurface utility infrastructure. The initial map data can be of various types such as Geographic Information System (GIS) data, Computer Aided Design (CAD) data, Postgres with geospatial extensions (PostGIS), image data such as Portable Network Graphics (PNG) format, various vector or raster formats etc. The term "map" as used herein can refer to map data using these formats.

Frequently, available initial map data that pertains to locations of subsurface utility infrastructure is inexact and/or out of date. The initial digital map data can however (in some embodiments) be utilized in conjunction with data derived from terrain image analysis to e.g. reduce the size of regions of uncertainty (herein termed "tolerance" regions) of zones of subsurface utility infrastructure, as described hereinbelow.

Processing circuitry 210 (for example: image processing unit 260) can next receive (310) an image of a surface area to be mapped. The image can be received, for example, from image data repository 240 or from another source.

The received image can be associated with particular geographic coordinates that pertain to the perimeter of the image or to one or more particular features of the image.

In various embodiments, the received image can be of various image types. By way of non-limiting example: images can be optical images e.g. taken by a camera from overhead (e.g. via drone), horizontally (e.g. street view) etc. By way of further non-limiting example: images can be derivative of other types of imaging or other types of sensors e.g. infrared, hyperspectral, multispectral, electro-optic imaging, synthetic aperture radar imaging, remote geophysical sensing; lidar, etc.

Processing circuitry 210 (for example: image processing unit 260) can next identify (320) surface features in the image.

In the context of the current specification, the term "surface feature" can be broadly construed as a visible or detectable terrain feature that is informative of the location and/or type of utility infrastructure that lies below the terrain surface. Some surface features connect to subsurface utility infrastructure in a manner that indicates the location of the point of connection. Such surface features are herein said to be of the "infrastructure connection point" surface feature type.

By way of non-limiting example, when water transport infrastructure is located below a terrain surface, surface features such as valves, municipal drains, access channels, pump facilities etc, can be present.

By way of further non-limiting example, when electric power infrastructure is located below a terrain surface, surface features such as electricity transmission poles, transformers etc. can be present.

By way of further non-limiting example, when other utility infrastructure is located below a terrain surface, other appropriate surface features can be present.

By way of further non-limiting example, terrain markings indicative of a current or past excavation to install utility infrastructure can be present. Such markings can include e.g. soil phenomena, spectral signature phenomena, vegetation, or other indications that discriminate an excavation area from its surroundings. Such a surface feature is herein said to be of the "excavation footprint" or "excavation evidence" surface feature type.

By way of further non-limiting example, regions with characteristics of undisturbed or unexcavated terrain can be present e.g. vegetation, trees, building structures, or undisturbed rock or earth configurations. Such a surface feature is herein said to be of the "unexcavated terrain area" surface feature type.

By way of further non-limiting example, public works surface markings can be present, as described below with reference to FIGS. 6A-6E. Such surface features are herein said to be of the "public works surface markings" surface feature type. As described below, public works surface markings can be of various types, including:
- utility point road marking
- utility point marking flag
- utility location linear road marking
- displaced utility point indicator road marking
- utility absence zone road marking.

Processing circuitry 210 (for example: image processing unit 260) can utilize image analysis/computer vision methods as known in the art to identify surface features. Processing circuitry 210 (for example: image processing unit 260) can also identify the surface feature type and/or the surface feature orientation (i.e. the direction to which the transformer etc. is oriented).

Processing circuitry 210 (for example: image processing unit 260) can also identify respective geographic coordinates indicative of the location of the surface feature, using methods as known in the art. In some cases, the surface feature location can be coordinates of a single point on the terrain. In some cases, the surface feature location can be coordinates of a zone.

Optionally: processing circuitry 210 (for example: image processing unit 260) can utilize multiple images of a terrain area. By way of non-limiting example, multi-temporal image sets (e.g. a series of historical images) can be used which can provide excavation footprint surface features that are not visible in more recent images. By way of further non-limiting example, images from different vantage points (e.g. overhead and street view) can be used to provide different surface features. By way of further non-limiting example, images from different types of cameras/sensors can be utilized to provide different surface features.

Processing circuitry 210 (for example: mapping unit 270) can next calculate (330) data indicative of a location of utility infrastructure from the identified surface features.

In some embodiments, processing circuitry 210 (for example: mapping unit 270) does this by, for at least one surface feature: a) determining data indicative of a location of a utility infrastructure in accordance with, at least, the surface feature type and the surface feature location.

A range of anticipated possible deviation from an estimated location of a point or a zone of subsurface utility infrastructure is herein termed a "location tolerance". In some embodiments, processing circuitry 210 (for example: mapping unit 270) additionally performs: b) determining a location tolerance in accordance with, at least, the surface feature type—as will be described hereinbelow.

In some deployment examples, presence of (for example) a water valve on the terrain surface can be informative of a water transport infrastructure located directly beneath the valve. In this case, processing circuitry 210 (for example: mapping unit 270) can accordingly calculate the location of a point of the water transport infrastructure from the surface feature location.

More specifically: in cases where the surface feature is of the infrastructure connection point (ICP) type, processing circuitry 210 (for example: mapping unit 270) can calculate data indicative of the location of (for example) the point of connection to the subsurface utility infrastructure, in accordance with the type of ICP (e.g. water valve etc.), in conjunction with the surface feature location In some deployment examples, the presence of (for example) a surface water valve on the terrain surface can be informative of the water transport infrastructure being located within a 1-meter radius of the valve (for example: due to technical constraints, or due to utility provider policy). In this case, the 0-to-1 meter range within which the point of subsurface water transport infrastructure can be located is termed a "utility distance range". In—for example—this case, processing circuitry 210 (for example: mapping unit 270) can accordingly estimate the location of a point of the infrastructure in accordance with the location of the surface feature, and—optionally—the utility distance range (for example: by estimating the point to be in the center of the diameter and underneath the valve, or at some other point in the diameter). Processing circuitry 210 (for example: mapping unit 270) can also then calculate a location tolerance in accordance with the "utility distance range" (for example: the location tolerance can be 1 meter in any direction). It is noted that when the distance between the surface feature and the point of the infrastructure is known precisely (e.g. from technical constraints or policy of the utility provider), the utility distance range is 0.

In some deployment examples, the presence of (for example) a surface water valve on the terrain surface can be informative of the water transport infrastructure being located within 1-meter of the valve—in a particular direction relative to the orientation of the valve (e.g. it may be known that the infrastructure can be located within 1 meter away, at a 90-degree angle to the valve). In this case, processing circuitry 210 (for example: mapping unit 270) can accordingly estimate the location of a point of the water transport infrastructure in accordance with the location of the surface feature, the orientation of the surface feature, the utility distance range (0-to-1 meter), and the infrastructure direction associated with the infrastructure connecting point type.

In cases where the surface feature is of the excavation footprint type, processing circuitry 210 (for example: mapping unit 270) can calculate data indicative of the location of the zone of the subsurface utility infrastructure in accordance with the surface feature location zone (e.g. the zone of the subsurface utility infrastructure can be identical to the surface feature location zone).

In cases where the surface feature is of the unexcavated terrain area type, processing circuitry 210 (for example: mapping unit 270) can calculate data indicative of the location the zone of the subsurface utility infrastructure in accordance with the surface feature location zone (e.g. the zone of the subsurface utility infrastructure can be identical to the surface feature location zone).

In cases where the surface feature is of the public works surface marking type, processing circuitry 210 (for example: mapping unit 270) can calculate data indicative of the location of the point, zone, or absence zone of the subsurface utility infrastructure in accordance with the specific type of public works surface marking e.g.
- in a case of a utility point road marking or utility point marking flag processing circuitry 210 (for example: mapping unit 270) can calculate data indicative of the location of the point of the subsurface utility infrastructure in accordance with the location of the marking point or flag.

in a case of a utility location linear road marking, processing circuitry 210 (for example: mapping unit 270) can calculate data indicative of the location of the point of the subsurface utility infrastructure in accordance with the location of the marking line.

in a case of a displaced utility point indicator road marking, processing circuitry 210 (for example: mapping unit 270) can calculate data indicative of the location of the point of the subsurface utility infrastructure in accordance with the location of the marking point, and the displacement distance and displacement direction associated with the marking indicator.

in a case of a utility absence zone road marking, processing circuitry 210 (for example: mapping unit 270) can calculate data indicative of the location of the zone of absence of the subsurface utility infrastructure in accordance with the location of the marking, and the size or perimeters of the absence zone as preknown, assumed, or associated with the marking.

Processing circuitry 210 (for example: image processing unit 260) can next define (340) a zone including a subsurface utility infrastructure—by utilizing the calculated utility location data (and optionally utilizing initial map data). An example method of defining such a zone is described hereinbelow, with reference to FIG. 4.

It is noted that the teachings of the presently disclosed subject matter are not bound by the flow diagram illustrated in FIG. 3, and that in some cases the illustrated operations may occur concurrently or out of the illustrated order (for example: operations 300 and 310 can be reversed). It is also noted that whilst the flow chart is described with reference to elements of the system of FIG. 2, this is by no means binding, and the operations can be performed by elements other than those described herein.

Figure 4:
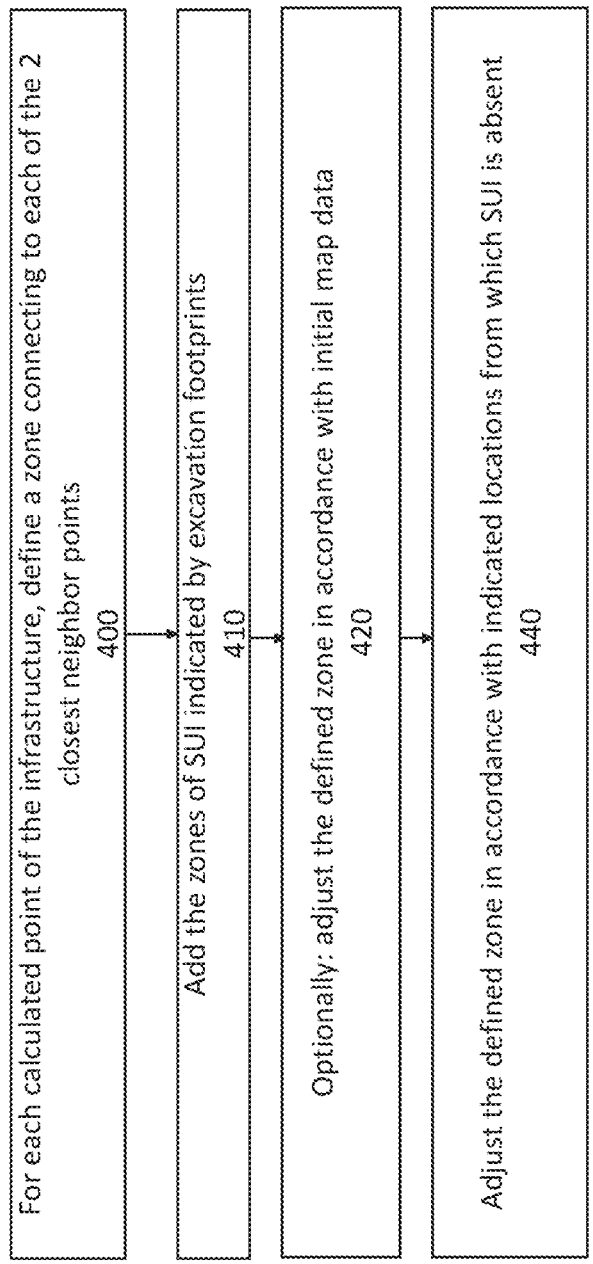
FIG. 4, illustrates a flow diagram of an example method of defining a location of a zone including the SUI in accordance with the calculated utility locations, in accordance with some embodiments of the presently disclosed subject matter.

Attention is now directed to FIG. 4, which illustrates a flow diagram of an example method of defining a location of a zone including the SUI in accordance with the calculated utility locations, in accordance with some embodiments of the presently disclosed subject matter.

Processing circuitry 220 (for example: mapping unit 270) can utilize the IULs (calculated from the surface features) to define coordinates of a zone including the SUI. The zone can then be utilized—for example—to avoid damage to the SUI during excavation operations. Such a zone is herein termed an "approximated utility zone".

If—for example—there are points of SUI that were calculated from surface features of the infrastructure connection point type, then processing circuitry 210 (for example: mapping unit 270) can—for each SUI point define (400) a zone connecting the point to (for example) its two closest neighbors. processing circuitry 210 (for example: mapping unit 270) can define these zones so as to incorporate uncertainty about the actual path of the utility line between the identified SUI points. processing circuitry 210 (for example: mapping unit 270) can define these zones so as to incorporate uncertainty about the precise location of the SUI points that result from location tolerance.

Processing circuitry 220 (for example: mapping unit 270) can add (420) the zones of SUI indicated by excavation footprint surface features.

Optionally: processing circuitry 220 (for example: mapping unit 270) can adjust (430) the defined zone in accordance with initial map data. For example: if the utility locations indicated by initial map data are highly consistent with calculated utility locations, then processing circuitry 220 (for example: mapping unit 270) can reduce the tolerance included in the zone definitions.

Finally, processing circuitry 220 (for example: mapping unit 270) can adjust (440) the defined zone in accordance with SUI-free zones as indicated by unexcavated area surface features.

It is noted that the teachings of the presently disclosed subject matter are not bound by the flow diagram illustrated in FIG. 4, and that in some cases the illustrated operations may occur concurrently or out of the illustrated order (for example: operations 400 and 410 can be reversed). It is also noted that whilst the flow chart is described with reference to elements of the system of FIG. 2, this is by no means binding, and the operations can be performed by elements other than those described herein.

Attention is now directed to FIGS. 5A-5E, which illustrate an example overhead image of a terrain area with successive steps to define a zone including a subsurface utility infrastructure, on the basis of surface features indicative of locations of the subsurface utility infrastructure, in accordance with some embodiments of the presently disclosed subject matter.

FIG. 5A illustrates an example overhead image of a terrain area, together with example surface features. Excavation footprint 510 can be an area where previous excavation is discernable (for example a ditch, or earth which has been placed to fill a ditch). Processing circuitry 210 (e.g. image processing unit 260) can identify the excavation footprint using computer vision and image analysis techniques as known in the art. For example, processing circuitry 210 (e.g. image processing unit 260) can include a convolutional neural network trained to identify excavation markings in overhead images.

For the current example, surface features 510A 510B 510C can be—for example—electrical transformers, which are connected to subsurface electrical infrastructure at points 520A 520B 520C respectively. It is noted that points 520A 520B 520C are—for example—not visible in the overhead image. Each point 520A 520B 520C is—in the current example—a fixed distance and orientation from the respective transformers 510A 510B 510C (for example: because of the policy or technical constraints of the utility provider). Processing circuitry 210 (e.g. image processing unit 260 and mapping unit 270) can identify transformers 510A 510B 510C in the overhead image, and infer the locations of 520A 520B 520C.

For the current example, unexcavated terrain 440 can be a tree area. Processing circuitry 210 (e.g. image processing unit 260) can identify the tree area 440. Processing circuitry 210 (e.g. mapping unit 270) can infer the absence of subsurface utility infrastructure from the terrain coordinates corresponding to unexcavated terrain 440.

FIG. 5B illustrates an example first step of defining a zone including the subsurface utility infrastructure. Processing circuitry 210 (e.g. mapping unit 270) can define lines that connect the inferred locations of points of the SUI. FIG. 5C illustrates example tolerance zones resulting from uncertainty of the subsurface path of the electrical supply cable which connects the inferred locations of points of the SUI. Processing circuitry 210 (e.g. mapping unit 270) can define these zones in accordance with known policies and/or known technical constraints affecting installation of the utility. Processing circuitry 210 (e.g. mapping unit 270) can define the lines with a particular width.

FIG. 5D illustrates an example next step of the processing circuitry 210 (e.g. mapping unit 270) extending the defined zone in accordance with the excavation footprint (for example: edges of the zone can be identical with the excavation footprint).

FIG. 5E illustrates an example additional step of defining the zone of the subsurface utility infrastructure in accordance with the location of the tree area. By way of non-limiting example, processing circuitry 210 (e.g. mapping unit 270) can reduce the extent of tolerance in the zone so that there is no overlap with unexcavated terrain 440 (as will be described in more detail below with reference to FIG. 5).

Attention is now directed to FIGS. 6A-6E, which illustrate non-limiting examples of public works surface markings (PWSMs), in accordance with some embodiments of the presently disclosed subject matter.

Public works surface markings can be markings that were placed on public infrastructure to indicate placement of utilities. In some examples, utility construction crews place PWSMs on surfaces after installing underground utility infrastructure. In some other examples, surveyors place PWSMs subsequent to utility installation.

There exist multiple standardizations of PWSMs. For example see: "Best Practices Guide" published by the Common Ground Alliance, or "Underground Infrastructure Damage Prevention—Best Practices 3.0" published by the Canadian Common Ground Alliance.

In some examples, PWSMs consist of painted text and/or symbols on surfaces such as roads or sidewalk. In some examples PWSMs consist of flags (possibly including text and/or symbols) placed on open terrain.

In some examples, the color of the marking (or flag) can indicate the type of utility (e.g. red for utility type of electric power lines, blue for utility type of potable water etc.) associated with a PWSM. In some examples, a marking can include text or images or other data that is indicative of supplementary data associated with a PWSM (such as the owner, operator, other identifier etc. of the utility; diameter, depth etc. of the utility line; other supplementary data).

In some embodiments of the presently disclosed subject matter, processing circuitry 210 (for example: image processing unit 260) identifies PWSMs in images. Such identified PWSMs can constitute surface features. Processing circuitry 210 (for example: mapping unit 270) can then calculate data indicative of locations of utility infrastructure from the PWSM surface features.

FIG. 6A illustrates an example of a PWSM that is a utility location linear road marking. The line illustrated in FIG. 6A can denote that utility infrastructure is located directly beneath the line on the road. In this example, the line is non-contiguous, and includes text ("SBC") indicative of the owner of the utility. It is noted that a utility location linear road marking need not be strictly linear, and can have gaps, curves, elbows etc. A utility location linear road marking can be associated with e.g. a utility line diameter, or a utility line location tolerance. In some embodiments, the utility line diameter or utility line location tolerance can appear in the PWSM. In some other embodiments, the utility line diameter or a utility line location tolerance can be assumed or preknown.

FIG. 6B illustrates another example of a PWSM that is a utility location linear road marking. In this example, a different style of line marking is used. Again, the line illustrated in FIG. 6B can denote that utility infrastructure is located directly beneath the line. In this example, the diameter (42") appears in the PWSM—indicated by the preceding "W".

FIG. 6C illustrates an example PWSM that is a displaced utility point indicator road marking. In this example, the road marking includes an arrow and text indicating the displacement direction and displacement distance to indicate where the utility is in fact located. This example additionally includes text ("SBC") indicating the owner of the utility. In some embodiments, the utility line diameter or utility line location tolerance can appear in the PWSM. In some other embodiments, the utility line diameter or a utility line location tolerance can be assumed or preknown.

FIG. 6D illustrates an example PWSM that is a utility absence zone road marking. In this example, the road marking includes text (the word "NO") indicating that no utility is present. This example additionally includes text ("SBC") indicating the owner of the utility. In some examples, a utility absence road marking indicates absence of a utility within a certain explicit or implicit radius, within a certain explicit or implicit rectangular zone, or within a zone delimited by some other method (such as edges of a road intersection). In some embodiments, a utility absence zone location tolerance can be assumed or preknown, or can appear in the PWSM.

FIG. 6E illustrates an example PWSM that is a utility point road marking. In this example, the road marking illustrated in FIG. 6A can denote that utility infrastructure is located directly beneath the center of the symbol. In some embodiments, a utility line diameter or utility point location tolerance can appear in the PWSM. In some other embodiments, the utility point diameter or a utility point location tolerance can be assumed or preknown.

In some examples, a PWSM that is a utility point marking flag (not shown) can be utilized. A utility point marking flag can denote that utility infrastructure is located directly beneath the flag. In some embodiments, a utility line diameter or utility point location tolerance (or other data) can appear on the flag. In some other embodiments, the utility point diameter or a utility point location tolerance can be assumed or preknown.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A digital map product comprising data informative of a location of a zone in a surface area including a subsurface utility infrastructure (*SUI*),
   the digital map product being derivative of a method comprising:
   a) receiving, by a processing circuitry, a digital image of the surface area;

b) identifying, by the processing circuitry, in the digital image, one or more surface features, each surface feature being associated with a respective surface feature location;

c) for one or more of the identified surface features:

calculating, by the processing circuitry, an indication of utility location (IUL) from the respective surface feature and respective surface feature location, wherein the IUL is one of a group consisting of:

i) data indicative of a location of a point of the *SUI*,
ii) data indicative of a location of a zone of the *SUI*, and
iii) data indicative of a location of a zone from which the *SUI* is absent, thereby giving rise to one or more calculated IULs; and d) determining, by the processing circuitry, a location of a zone including the *SUI* ased on, at least, one or more of the calculated IULs.

2. The digital map product of claim 1, wherein the defining the location of the zone is in further accordance with initial map data.

3. The digital map product of claim 1 wherein, for at least one of the surface features, the calculating an IUL from the respective surface feature comprises:

determining the IUL in accordance with, at least, the respective surface feature location and a surface feature type of the surface feature.

4. The digital map product of claim 3, wherein the calculating the IUL from the surface feature further comprises:

determining an IUL location tolerance in accordance with, at least, the surface feature type.

5. The digital map product of claim 3, wherein the determining an IUL comprises:

responsive to the surface feature type being an infrastructure connecting point:

calculating a location of a point of the *SUI* in accordance with a utility distance range associated with an infrastructure connecting point type.

6. The digital map product of claim 5, further comprising:

calculating an IUL location tolerance in accordance with a utility distance range associated with an infrastructure connecting point type.

7. The digital map product of claim 5, wherein the calculating the location of the point of the *SUI* is in further accordance with:

a) an orientation of the surface feature; and
b) an infrastructure direction associated with the infrastructure connecting point type.

8. The digital map product of claim 3, wherein the determining an IUL comprises:

responsive to the surface feature type being one of a group consisting of:

a) a utility point road marking, and
b) a utility point marking flag, calculating a location of a point of the *SUI* in accordance with a utility distance range associated with, at least, the surface feature location.

9. The digital map product of claim 3, wherein the determining an IUL comprises:

responsive to the surface feature type being one of a group consisting of:

a) an excavation footprint, and
b) a utility location linear road marking, calculating a location of a zone of the *SUI* in accordance with, at least, the surface feature location.

10. The digital map product of claim 3, wherein the determining an IUL comprises:

responsive to the surface feature type being one of a group consisting of:

a) an unexcavated terrain area, and
b) a utility absence zone road marking, calculating a location of a zone from which the *SUI* is absent, in accordance with, at least, the surface feature location.

11. The digital map product of claim 3, wherein the determining an IUL comprises:

responsive to the surface feature type being a displaced utility point indicator road marking, calculating a location of a point from of the *SUI*, in accordance with, at least:

the surface feature location;
a displacement direction associated with the displaced utility point indicator; and
a displacement distance associated with the displaced utility point indicator.

12. The digital map product of claim 1, wherein each of the one or more calculated IULs in accordance with which the zone is defined is derivative of a public works service marking (PWSM) surface feature that is associated with at least one of a group consisting of:

a) a first utility type; and
b) a first utility operator.

13. The digital map product of claim 1, wherein the image is of a type selected from a list consisting of:

camera; infrared; hyperspectral; multispectral; electro-optic imaging; synthetic aperture radar imaging; magnetic sensing; remote geophysical sensing; ground penetrating radar; and lidar.

14. The digital map product of claim 1, wherein the image is of a vantage point selected from a list consisting of:

overhead; space; aerial; ground; façade; and horizontal view.

15. A method of determining data informative of a location of a zone including a subsurface utility infrastructure (*SUI*) in a given surface area, the method comprising:

a) receiving, by a processing circuitry, a digital image of the surface area;

b) identifying, by the processing circuitry, in the digital image, a one or more surface features, each surface feature being associated with coordinates of a respective surface feature location;

c) for each of the plurality of surface features:

calculating; by the processing circuitry, an indication of utility location (IUL) from the respective surface feature and respective surface feature location, wherein the IUL is one of a group consisting of:

i) data indicative of a location of a point of the *SUI*,
ii) data indicative of a location of a zone of the *SUI*, and
iii) data indicative of a location of a zone from which the *SUI* is absent, thereby giving rise of a plurality of IULs; and d) determining, by the processing circuitry, a location of a zone including the *SUI*, based on, at least, the plurality of IULs.

16. A system of determining data informative of a location of a zone including a subsurface utility infrastructure (*SUI*) in a given surface area, the system comprising a processing circuitry configured to:

a) receive a digital image of the surface area;
b) identify, in the digital image, one or more surface features, each surface feature being associated with a respective surface feature location;
c) for each of the plurality of surface features:

calculate an indication of utility location (IUL) from the respective surface feature and respective surface feature location, wherein the IUL is one of a group consisting of:
i) data indicative of a location of a point of the *SUI*,
ii) data indicative of a location of a zone of the *SUI*, and
iii) data indicative of a location of a zone from which the *SUI* is absent,
thereby giving rise of a plurality of IULs; and
d) determine a location of a zone including the *SUI* in based on, at least, the plurality of IULs.

17. A computer program product comprising a computer readable non-transitory storage medium containing program instructions, which program instructions when read by a processing circuitry, cause the processing circuitry to perform a method of determining data informative of a location of a zone including a subsurface utility infrastructure (*SUI*) in a given surface area, the method comprising:

a) receiving a digital image of the surface area;
b) identifying, in the digital image, one or more surface features, each surface feature being associated with a respective surface feature location;
c) for each of the plurality of surface features:
calculating an indication of utility location (IUL) from the respective surface feature and respective surface feature location, wherein the IUL is one of a group consisting of:
i) data indicative of a location of a point of the *SUI*,
ii) data indicative of a location of a zone of the *SUI*, and
iii) data indicative of a location of a zone from which the *SUI* is absent,
thereby giving rise of a plurality of IULs; and
d) determining a location of a zone including the *SUI* in based on, at least, the plurality of IULs.

* * * * *